March 30, 1965 H. REINSCH 3,176,312

AUTOMATIC EXPOSURE REGULATING TRANSDUCER ARRANGEMENT

Filed May 1, 1962 2 Sheets-Sheet 1

INVENTOR
Herbert Reinsch by:
Michael S. Striker
Attorney

INVENTOR
Herbert Reinsch by:
Michael S. Striker
Atty

United States Patent Office 3,176,312
Patented Mar. 30, 1965

3,176,312
AUTOMATIC EXPOSURE REGULATING
TRANSDUCER ARRANGEMENT
Herbert Reinsch, Stuttgart, Germany, assignor to Eugen Bauer G.m.b.H., Stuttgart-Unterturkheim, Germany
Filed May 1, 1962, Ser. No. 191,563
8 Claims. (Cl. 352—141)

The present invention is a transducer arrangement responsive to the application thereto of variable amounts of energy and causing a movable member to assume a position corresponding to the magnitude of said energy applied thereto. An arrangement of this type may be used either for measuring such amounts of energy or for regulating the application of such energy in a predetermined manner. The invention is particularly well suited for being applied to exposure meters or exposure regulators for photographic cameras.

In known devices of this general type electrical means are provided for varying an electric current in proportion to the energy applied to the device, and such current is used for moving a usually rotatable member against the counteraction of a directive force e.g. a spring to a position which depends on the magnitude of said current. However, the accuracy of such a device is impaired if the voltage of the source furnishing the electric current varies. In addition, the elastic characteristic of the counter-acting element e.g. a spring may vary with time. Therefore it is usually necessary to re-calibrate such instruments from time to time.

Another known device comprises two moving coils arranged perpendicular to each other operating in different portions of a magnetic field, the coils being exposed to varying field intensities as they move through different positions. When currents flowing through the coils differ from each other the moving coil system assumes a position wherein the field intensities are respectively inversely proportional to the different currents flowing through the coils. These devices do not require a counter-acting directive force. However, the variation of the field intensity relative to different positions of the moving coil system depends on a variation of the air gap between the coils and the field producing magnet. Consequently, the delicate dimensioning of the air gap and the care for precise distribution of the magnetic field render these devices highly sensitive and costly, and minor deviations of these features from desired values thereof lead to wrong indications.

It can be seen that in such known devices the amount of movement of the movable member may easily be out of proportion with the amount of energy applied to the device. If, for instance, the movement of the movable member is used for controlling the exposure in making photographs or moving pictures, considerable errors may occur the reason for which may be difficult to find. Also, it would be necessary to produce all the components of such devices with utmost precision with narrow tolerances whereby production costs are prohibitive, particularly if mass production of such devices is desired.

It is therefore one object of this invention to provide for a transducer arrangement as mentioned above which is free of the disadvantages of known devices.

It is another object of this invention to provide for a transducer arrangement which is entirely reliable by being independent of voltage variations of the source of electric energy and does not require a spring or similar device for counter-acting the movement of the movable member.

It is still another object of the invention to provide for a transducer arrangement as set forth which is comparatively simple in its structure and which does not require the extreme precision of known devices, and therefore is quite suitable for mass production at reasonable cost.

With above objects in view the invention includes a transducer arrangement responsive to the application thereto of variable amounts of energy and causing a movable member to assume a position corresponding to the magnitude of said energy applied thereto, comprising, in combination, first transducer means adapted to be exposed to the application of variable amounts of energy and including electrical means having a resistance value varying depending upon the amount of energy applied to said transducer means, whereby varying amounts of applied energy are converted into corresponding varying resistance values; second transducer means including means producing a magnetic field and first and second electrical moving means cooperating jointly with portions of said field of respectively equal intensity, and a movable member movable in a first and in a second opposite direction, respectively, by said electrical moving means depending upon which of said electrical moving means carries a greater amount of electric current passing therethrough, whereby the difference between said electric currents is converted into a corresponding movement of said movable member in one or the other direction; electric circuit means including a source of electric energy and having two parallel circuit branches, said resistance means and said first electrical moving means being located in one of said branches, and said second electrical moving means and at least one compensating resistor being located in the other one of said branches, so that a variation of said resistance value causes said current in one of said electrical moving means to be greater than in the other one thereof; and regulator means actuated by said movable member for varying the amount of energy applied to said first transducer means and thereby varying said resistance value in a predetermined proportion to the movement of said movable member until the difference between said currents causing such movement is eliminated and both said currents are equal to each other.

In another aspect, the invention includes a regulating arrangement responding to the influence of an outside energy applied thereto, comprising, in combination, a movable control member movable along a predetermined path in opposite directions; a source of electric current; First and second electrical means connected in parallel with each other with said source and permanently tending to move said movable control member with equal force in opposite directions, respectively, whenever the currents furnished by said source and passing through said first and second electrical means, respectively, are equal to each other in which case said movable control member is held in stationary balance between the forces of said oppositely acting first and second electrical means;

First current varying means cooperating with said first electrical means, and second current varying means cooperating with said second electrical means, said first current varying means including transducer means responding to variations of an amount of outside energy applied thereto by varying the current passing through said first electrical means in such a manner that upon a variation of said amount of outside energy applied to said transducer means from a predetermined normal value quantitatively in one sense said current through said first electrical means increases, and upon such variation of said amount of outside energy in opposite sense said current through said first electrical means decreases, so that upon such current increase the force of said first electrical means exceeds that of said second electrical means and moves said movable control member in one direction, while upon current decrease a movement thereof in opposite direction is produced, said first and second current varying means being preadjusted to render said currents passing through said first and second electrical means equal to each other when said amount of outside energy applied to said transducer means has said predetermined normal value; and Regulator means actuated by movement of said movable control member along said predetermined path in either one of said opposite directions, said regulator means being adapted when actuated to increase the influence of said variation of said amount of outside energy when said energy applied to said transducer means is below said predetermined normal value, and to decrease said influence when said amount of outside energy applied to said transducer means is above said predetermined normal value, until said currents passing through said first and second electrical means are again equal to each other and said movable control member is held in a balance position.

It is evident that in an arrangement according to the invention as stated above the movement of the movable member is independent of a counter-acting directive force and also of the distribution of the magnetic field since the electrical moving means always cooperate with portions of the field which are equal to each other. It is of particular advantage to arrange the electrical moving means in such a manner that both are always located in the same portion of the magnetic field. It can be seen further that the movable member of the second transducer reaches a definite position corresponding to the energy applied to the first transducer only when the regulator means has eliminated the difference between the currents in the two electrical moving means which caused the movement of the movable member. In this manner it is assured that the amount of movement of the movable member of the second transducer precisely indicates the amount of energy applied to the first transducer so that the device can be used as a meter instrument, or that a control member connected with or incorporated in the movable member assumes a position corresponding to the energy applied to the first transducer and is capable of controlling other devices accordingly.

By means of the regulator means the amount of energy acting on the first transducer is automatically regulated through the movement of the movable member of the second transducer to a predetermined value whenever the just-mentioned amount of energy differs from such predetermined value. Consequently, the arrangement is even independent of the characteristic of the variable resistance of the first transducer i.e. the ratio between the applied amount of energy and the variation of the resistance. Moreover, the arrangement according to the invention is entirely independent of variations of the voltage of the source of electric energy. The speed of response of the arrangement may decrease when said voltage decreases but nevertheless a correct amount of movement of the movable member will be obtained.

This is of particular advantage if the arrangement according to the invention is used in a photographic camera which term in this application includes movie cameras. In such a case the source of electric energy can only be a storage battery the voltage whereof changes with time. In addition, under these circumstances the source of electric energy for the transducer arrangement may even be the battery which is used for driving the motor of a movie camera so that the available voltage could depend upon the transient operating conditions of the camera.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
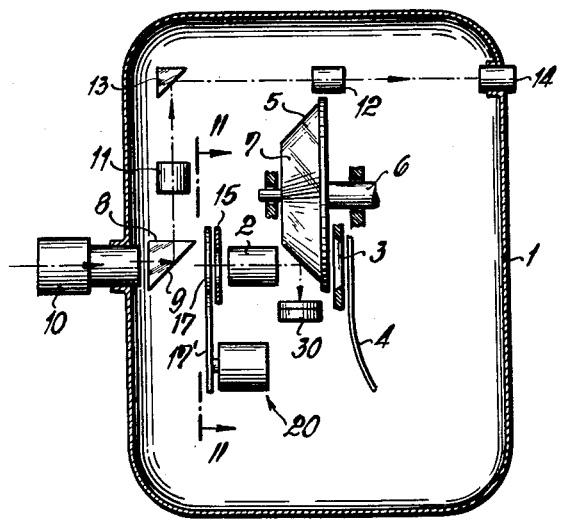
FIG. 1 is a diagrammatic sectional elevation of a movie camera containing a transducer arrangement according to the invention.

The drawings illustrate by way of example a movie camera in diagrammatic fashion, all parts which are not referred to in the following description being left out in order not to encumber the illustrations. The camera housing is indicated by the contour line 1. Mounted within this housing is a main objective 2. In line with the optical axis thereof and further to the rear of the camera is a window 3 along the rear side whereof a film 4 may be moved stepwise in well known manner for being exposed. A rotary, preferably semicircular shutter 5 supported by a shaft 6 as illustrated in plan view by FIG. 1a, is so arranged between the objective 2 and the window 3 that during its rotation it alternatingly covers and clears the window 3. In this embodiment of the invention the shutter 5 is provided with a conical reflecting mirror surface 7.

In front of the main objective 2 a prism 8 is arranged which has a surface 9 inclined at 45° with respect to the optical axis of the objective 2, the surface 9 being semi-reflecting. In front of the prism 8 a lens system 10 is arranged which is adapted to vary the focal length thereof. A portion of the light entering through the lens system 10 is reflected by the surface 9 of the prism 8 through lens systems 11 and 12 and across a reflecting prism 13 to a viewer ocular 14.

Figure 2:
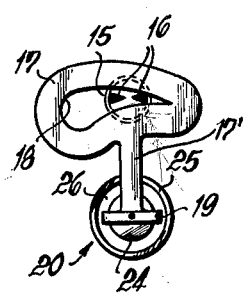
FIG. 2 is a partial plan view of another portion of the arrangement according to FIG. 1, taken in direction of arrows II in FIG. 1.
Figure 3:
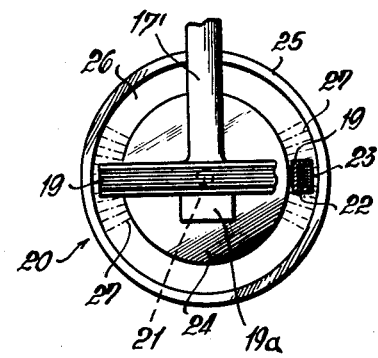
FIG. 3 is a partial plan view at larger scale, partly in section, of the transducer arrangement 20 in FIGS. 1 and 2.

The main portion of the light reaching the prism 8 passes therethrough and enters the objective 2. Across the path of light a fixed diaphragm 15 of conventional type is arranged. It is of substantially circular shape as seen in FIG. 2 but is provided with two masking wedges 16 as shown. Between the diaphragm 15 and the prism 8 a movable regulator in the form of a diaphragm or template 17 is arranged which is shown clearly in FIG. 2 and is provided with a drop-shaped aperture 18, the center line whereof is in all positions of the member 17 substantially in alignment with the wedges 16. The regulator member 17 is connected by an arm 17' with the movable member 19 of a transducer 20. The member 19 is turnable about an axle 21 as shown in FIG. 3 so that also the regulator member 17 is turnable about the axle 21.

Figure 3A:
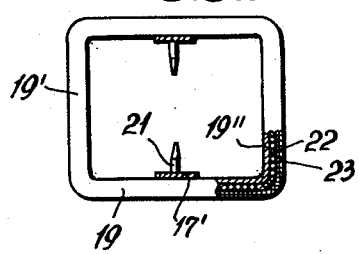
FIG. 3a is a partial view taken perpendicularly of that of FIG. 3 and illustrating details of the arrangement of FIG. 3.

The movable member 19 is constructed as a frame as shown in FIG. 3a and carries two wire coils 22 and 23 wound in opposite directions to each other in the manner illustrated by FIG. 3a. In the illustrated example the coil 23 is wound over the coil 22 but it is obvious that the two coils could also be wound one next to the other. Within the movable frame member 19 a cylindrical permanent magnet 24 of substantial strength is stationarily mounted. An outer cylindrical shell of ferromagnetic material is mounted concentrically with the magnet 24 so as to leave an annular space therebetween in which the frame portions 19' and 19'' with the corresponding portions of the coils 22 and 23 are free to move about axle 21. Consequently, magnetic field lines 27 as shown extend through the annular gap 26. It can be seen that in this example both coils 22 and 23 are always exposed jointly to respectively the same portions of the magnetic field no matter whether the coil portions move to positions in field portions of different intensity. As will be shown the coils 22 and 23 act as electrical moving means for moving the movable frame member 19 and the regulator member 17 depending upon currents passing through the coils 22, 23. In order to render the movable system 19, 17 independent of influences of gravity it is advisable to provide for a counter-weight 19a for compensating the weight of members 17 and 17' so that the positions of the movable system are determined only by electric or magnetic forces.

Figure 1A:
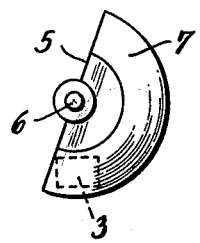
FIG. 1a is a partial plan view of one component of the arrangement according to FIG. 1.

When the rotary shutter 5 is in any one of its positions in which it covers the window 3, for instance as shown in FIG. 1a, and in which its reflecting conical surface 7 is exposed to light rays passing through the objective 2, then such rays are reflected in the direction indicated in FIG. 1 so as to impinge on a photocell 30 which has a resistance varying with the amount of light energy applied thereto.

This arrangement assures that the amount of light impinging on the photocell 30 is always exactly equal to that amount of light energy which passes through the objective 2 and which reaches the film 4 whenever the shutter 5 is in a position in which the path of light through window 3 is unobstructed.

Of course, the lens system 10 may be adjusted as required to different focal lengths or may be removed and replaced by a different lens system.

Figure 4:
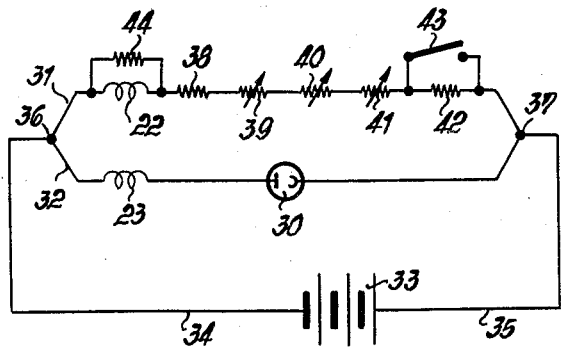
FIG. 4 is a schematic circuit diagram of the arrangement according to FIG. 1.

Referring now to FIG. 4 it can be seen that the coils 22 and 23 are arranged in two parallel branches 31 and 32, between junction points 36 and 37, of a circuit 34, 35, containing a battery 33 as source of electric energy. In the present example the battery would also be located within the camera housing 1.

The branch 32 contains in addition to the coil 23 also the photocell 30 having a variable resistance. The branch 31 contains in addition to the coil 22 a series of resistors of which resistor 38 is a compensating resistor as will be described below, while the resistors 39, 40 and 41 are variable and may be adjusted by hand, namely resistor 39 in accordance with the frame frequency provided or set for the camera operation, resistor 40 in accordance with the sensitivity of the film material being used, and resistor 41 in accordance with correction factors determined by filters that may be used in connection with the normal camera objective. These variable resistors may be operatively coupled with corresponding control means of the camera e.g. with the means for determining the frame frequency or for selecting filters, so that the corresponding resistors are automatically adjusted.

A further resistor 42 is provided in series with the above mentioned resistors and is combined with a by-pass circuit containing a switch 43. By closing the switch 43 the resistor 42 can be shunted. It is to be understood that when the camera is not being operated the rotary shutter 5 is in a position e.g. as shown by FIG. 1a, in which light reflected by the surface 7 continuously irradiates the photocell 30. However when the camera is in operation light is reflected only during those periods when the window 3 is obstructed. Consequently, during operation of the camera only one-half of the light impinging during standstill on the photocell 30 is applied thereto, provided that the shutter 5 is of semi-circular form as shown by FIG. 1a. In order to assure proper operation of the arrangement according to the invention the just-described conditions are taken into account by providing for closing the switch 43 and shunting the resistor 42 when the camera is not operating, while opening the switch 43 and rendering the resistor 42 effective when the camera is in operation.

A second compensating resistor 44 is connected in parallel with the coil 22. This resistor 44 is so dimensioned that when equal currents flow through the branches 31 and 32 the forces derived from the magnetic field and acting on the coils 22 and 23 compensate each other so that no movement of the movable frame member 19 is produced.

The compensating resistor 38 is to be dimensioned in such a manner that with a predetermined basic adjustment of the resistors 39, 40 and 41 and with a preselected amount of light energy passing through the objective 2 the movable frame member 19 and more particularly the template member 17 with its opening 18 are in a desired position, namely that position in which the amount of light passing through the opening 18 and through the diaphragm 15 is correct for properly exposing the film. In this position the currents passing through the branches 31 and 32 must be equal to each other.

Of course, the selection or calibration of the resistor 38 is made in the course of assembling the arrangement and does not depend upon any manipulation by the user of the camera. Also, the basic adjustment of the variable resistors 39, 40 and 41 is made with respect to a selected frame frequency, a selected film material and a selected use of a filter or of no filter.

After the arrangement has been calibrated in the above described manner it is ready for operation. The switch 43 is to be set depending upon the ensuing operating condition of the camera. If now the amount of light energy impinging on the photocell which constitutes the first transducer of the arrangement is greater than the selected amount of light energy used in the above-described calibration of the arrangement, then the resistance of the photocell 30 decreases. Consequently, the current in the branch 32 increases and so does the current flowing through the coil 23. Therefore the electromagnetic fields produced by the coils 22 and 23 do not balance each other any more but the differential electromagnetic field produced by the more strongly energized coil 23 in cooperation with the permanent magnetic field 27 produces a torque turning the movable frame member 19 in one direction namely in counter-clockwise direction as seen in FIG. 2, and until the amount of light permitted to pass through the respective portion of opening 18 and through the diaphragm 15 is reduced to such an extent that the amount of light impinging on the photocell 30 is again equal to the selected amount of light that had been used in the calibration of the arrangement. At this moment the currents passing through the branches 31 and 32 are made equal to each other so that no torque is further produced and the movable system 17, 19 is standing still. In other words, in this position of the member 17 the amount of light passing through the objective 2 and reaching the film 4 is now limited to the proper amount for correctly exposing the film material as taken in consideration during the calibration of the arrangement.

On the other hand, if the amount of light passing through the objective 2 is smaller than that amount of light which had been used in the calibration of the arrangement, then a correspondingly smaller amount of light impinges on the photocell 30 so that its resistance increases and the current passing through the coil 23 decreases. Consequently, the unbalanced portion of the electromagnetic force produced by the coil 22 generates in cooperation with the magnetic field 27 a torque in opposite direction so that now the movable system 17, 19 turns in opposite direction so that more light is permitted to pass through the diaphragm 15. This continues until the amount of light impinging on the photocell is again equal to the amount used in the calibration procedure and again the currents in the branches 31 and 32 are equal to each other. At this moment the movable system 17, 19 remains stationary in the thus reached position. As mentioned above, no other outside forces have any influence on this movable system.

It can be seen that the just described operation takes place irrespective of the kind of distribution of the magnetic field intensity along the gap 26. If it should be desirable to derive from the movable system 17, 19 control forces of particular magnitude in certain regions of the movement thereof, e.g. if the movable frame member 19 is connected with control means to be actuated thereby, then steps may be taken for rendering the magnetic field 27 correspondingly stronger in such regions. However, by doing this only the magnitude of the torque is changed, but the position of the movable frame member 19 will remain dependent only on the amount of light energy applied to the first transducer namely the photocell 30.

Figure 5:
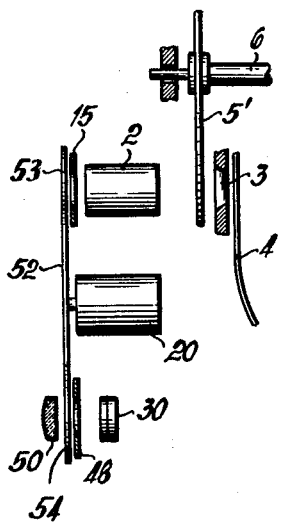
FIG. 5 is a partial diagrammatic plan view of an arrangement containing certain modification of the arrangement according to FIG. 1.
Figure 6:
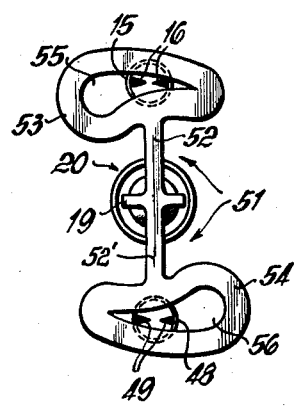
FIG. 6 is a plan view of certain elements of the arrangement according to FIG. 5.

Referring now to FIGS. 5 and 6, the modification of the above-described arrangement concerns only some of its components. The elements of the arrangement of FIGS. 5 and 6 which are identical with those of FIG. 1 are designated by the identical reference numerals. The rotary shutter 5 of FIG. 1 and FIG. 1a is replaced by a preferably semi-circular shutter 5' which has no conical reflecting surface. The first transducer or photocell 30 is now so located that its optical axis is substantially parallel with the optical axis of the main objective 2. An auxiliary fixed diaphragm 48 also provided with wedge-shaped masks 49 is placed in front of the photocell 30. An auxiliary lens 50 is arranged in front of the photocell 30 and of the diaphragm 48 so as to make the field of vision applying to the photocell 30 substantially equal to that of the objective 2. In this case it is not contemplated to use a lens system 10 which would change the field of vision of the objective 2.

In this case the movable frame member 19 carries a twin system of regulator means 51, namely a first diaphragm or template 53 with a drop-shaped opening 55 cooperating with the diaphragm 15 and connected by an arm 52, and a second diaphragm or template 54 with a drop-shaped opening 56 cooperating with the diaphragm 48 and connected by an arm 52'. If the arrangement is constructed symmetrically as illustrated by FIG. 6 no counter-weight for balancing the system is required.

The circuit arrangement according to FIG. 4 applies exactly as before also to the modification according to FIGS. 5 and 6. Also the operation thereof is exactly as described above.

The above-described regulator means may be constructed also in a different manner, e.g. having two or more template members movably mounted in a different manner and interconnected for joint movement either directly or by suitable transmission elements, but nevertheless being movable by the movement of the movable frame member 19. The arrangement may also be modified in such a manner that after an arbitrary adjustment of some other diaphragm which may also cause adjustment of one of the resistors 39–41, the shutter speed of a regular photographic camera is adjusted by the movement of the movable frame member 19. In this case a special diaphragm adjustable by the movement of the movable member 19 together with the shutter speed regulation would have to be arranged in front of the photocell.

It will be appreciated that in an arrangement according to the invention and as described above by way of example it is not of importance to provide for a precisely predetermined relation between the angle of turn of the movable member 19 and the corresponding area for the passage of light through the opening 18 and the diaphragm 15. This is due to the fact that the regulator means or template comes to a stand-still in a certain position only when that amount of light energy which has been taken into consideration in the calibration of the arrangement is applied to the first transducer or photocell. In the case of photographic and movie cameras it is also of great advantage that the arrangement does not require any later calibration after its sale because the cameras are then in the hands of a great number of scattered customers. In addition, cameras are manufactured in mass production and are supposed to be as inexpensive as possible which purpose is easily attained by the invention because the various components of the arrangement require only average precision and quality, yet assuring satisfactory operation. It is a further advantage that other factors affecting the proper exposure e.g. the sensitivity of the film material or the effect of filters can be taken into account in a very simple manner by providing the above-mentioned variable resistors in one branch of the circuit.

It should be noted that the arrangement according to the invention is not limited to the use in photographic or movie cameras. For instance the arrangement according to the invention may also be constructed and used as an independent exposure meter. In this case the movable frame member 19 would have to carry, in addition to the regulator means 17 or 53, 54, a pointer which would indicate the intensity of illumination along a suitable graduation. In this case also the resistor 42 and shunting switch 43 are not needed, and possibly even the resistors 39–41 may be dispensed with. Also in this case as in its use within a camera the arrangement is characterized by the advantage that it is entirely independent of variations of the voltage of the source of electric energy, of the form or distribution of the magnetic field, of the form and accuracy of the template opening 18, of the precision of the various components and of the characteristics of the photocell.

Apart from the preferred use of the arrangement in connection with cameras or exposure meters, the arrangement according to the invention may also be applied to other tasks in such a manner that the movable frame member 19 influences a control member which may control other devices by means of corresponding auxiliary circuits. For instance the movable member 19 may adjust a potentiometer. In this manner all kinds of devices may be actuated or controlled depending upon an amount of light energy impinging on or passing through the regulator template.

Moreover, it is not absolutely necessary that the first transducer is responsive to the application of light energy, it might as well be responsive, for other purposes, to wave lengths different from those of visible light, as infrared radiation or to radiation of a different nature as for instance particle radiation. In that case the second transducer would actuate a sort of diaphragm which influences or modifies the amount of such waves or rays impinging on the first transducer, and would additionally actuate or regulate other devices or phenomena that are to be controlled depending upon the intensity of the above mentioned waves or rays.

Finally, the first transducer may also be chosen to be responsive to the application of different types of energy, e.g. to the pressure of fluid or gaseous media. In that case the first transducer would influence valves or the like which regulate said pressure. In this manner for instance a liquid flowing through a pipe line can be kept at uniform pressure independent of the amount of liquid flowing. In other arrangements of this type wherein e.g. the pressure produced by a flowing liquid serves to influence the second transducer, the arrangement would be capable to cause the amount of liquid flowing per unit of time to remain constant.

It will be understood that each of the elements described above or two or more together, may also find a useful application in other types of transducer arrangements differing from the types described above.

While the invention has been illustrated and described as embodied in a transducer arrangement responsive to the application thereto of variable amounts of energy and causing a movable member to assume a position corresponding to the magnitude of said energy applied thereto, it is not intended to be limited to the details shown, since various modifications and structural changes may be made without departing in any way from the spirit of the present invention as defined in the claims.

What is claimed and desired to be secured by Letters Patent is:

1. A transducer arrangement responsive to the application thereto of variable amounts of radiation and causing a movable member to assume a position corresponding to the magnitude of said radiation energy applied thereto, comprising, in combination, first transducer means adapted to be exposed to the application of variable amounts of radiation energy and including radiation-responsive electrical resistance means having a resistance value varying depending upon the amount of radiation energy applied to said transducer means, whereby varying amounts of applied radiation energy are converted into corresponding varying resistance values; second transducer means including means producing a magnetic field and first and second coil means cooperating jointly with portions of said field of respectively equal intensity, and a movable member carrying said first and second coil means wound thereon in mutual superposition and movable in a first and in a second opposite direction, respectively, by said coil means depending upon which of said coil means carries a greater amount of electric current passing therethrough, whereby the difference between said electric currents is converted into a corresponding movement of said movable member in one or the other direction; electric circuit means including a source of electric energy and having two parallel circuit branches, said radiation-responsive resistance means and said first coil means being located in one only of said branches, and said second coil means and at least one compensating resistor being located in the other one of said branches, so that a variation of said resistance value causes said current in one of said coil means to be greater than in the other one thereof; and regulator means actuated by said movable member for varying the amount of energy applied to said first transducer means and thereby varying said resistance value in a predetermined proportion to the movement of said movable member until the difference between said currents causing such movement is eliminated and both said currents are equal to each other.

2. A transducer arrangement responsive to the application thereto of variable amounts of radiation energy and causing a movable member to assume a position corresponding to the magnitude of said radiation energy applied thereto, comprising, in combination, first transducer means adapted to be exposed to the application of variable amounts of radiation energy and including radiation-responsive electrical resistance means having a resistance value varying depending upon the amount of radiation energy applied to said transducer means, whereby varying amounts of applied radiation energy are converted into corresponding varying resistance values; second transducer means including means producing a magnetic field and first and second coil means cooperating jointly with portions of said field of respectively equal intensity, and a movable member carrying said first and second coil means wound thereon in interstitial winding arrangement and movable in a first and in a second opposite direction, respectively, by said coil means depending upon which of said coil means carries a greater amount of electric current passing therethrough, whereby the difference between said electric currents is converted into a corresponding movement of said movable member in one or the other direction; electric circuit means including a source of electric energy and having two parallel circuit branches, said radiation-responsive resistance means and said first coil means being located in one only of said branches, and said second coil means and at least one compensating resistor being located in the other one of said branches, so that a variation of said resistance value causes said current in one of said coil means to be greater than in the other one thereof; and regulator means actuated by said movable member for varying the amount of energy applied to said first transducer means and thereby varying said resistance value in a predetermined proportion to the movement of said movable member until the difference between said currents causing such movement is eliminated and both said currents are equal to each other.

3. A transducer arrangement responsive to the application thereto of variable amounts of radiation energy and causing a movable member to assume a position corresponding to the magnitude of said radiation energy applied thereto, comprising, in combination, first transducer means adapted to be exposed to the application of variable amounts of radiation energy and including radiation-responsive electrical resistance means having a resistance value varying depending upon the amount of radiation energy applied to said transducer means, whereby varying amounts of applied radiation energy are converted into corresponding varying resistance values; second transducer means including means producing a magnetic field including permanent magnet means arranged stationarily within an area adapted to be surrounded by coil means and a ferrous shell surrounding said permanent magnet means and spaced therefrom by an air gap, and first and second coil means cooperating jointly with portions of said field of respectively equal intensity, and a movable member carrying said first and second coil means wound thereon and having portions surrounding said permanent magnet means and partially extending through said air gap, said movable member being turningly movable in a first and in a second opposite direction, respectively, by said coil means depending upon which of said coil means carries a greater amount of electric current passing therethrough, whereby the difference between said electric currents is converted into a corresponding movement of said movable member in one or the other direction; electric circuit means including a source of electric energy and having two parallel circuit branches, said radiation-responsive resistance means and said first coil means being located in one only of said branches, and said second coil means and at least one compensating resistor being located in the other one of said branches, so that a variation of said resistance value causes said current in one of said coil means to be greater than in the other one thereof; and regulator means actuated by said movable member for varying the amount of energy applied to said first transducer means and thereby varying said resistance value in a predetermined proportion to the movement of said movable member until the difference between said currents causing such movement is eliminated and both said currents are equal to each other.

4. An automatic exposure regulating arrangement suitable for photographic camera means including a movie camera having a main objective and a shutter, the arrangement being responsive to the application thereto of variable amounts of light and causing a movable member to assume a position corresponding to the amount of light applied thereto, comprising, in combination, first transducer means adapted to be exposed to the application of variable amounts of light and including photoresponsive electrical resistance means exposed to light directed at the main objective of the camera and having a resistance value varying depending upon the amount of light applied to said transducer means, whereby varying amounts of applied light are converted into corresponding varying resistance values; second transducer means including means producing a stationary magnetic field and first and second electrical moving means cooperating jointly with portions of said field of respectively equal intensity and movable relative to said field in a first and in an opposite second direction, respectively depending upon which of said electrical moving means carries a greater amount of electric current passing therethrough, and a movable member movable in said first and in said second opposite direction, respectively, by said movable member, whereby the difference between said electric currents is converted into a corresponding movement of said movable member in one or the other direction; electric circuit means including a source of electric energy and having two parallel circuit branches, said photoresponsive resistance means being located in only one of said branches together with said first electrical moving means, and said second electrical moving means and at least one compensating resistor being located in the other one of said branches, so that a variation of said resistance value causes said current in one of said electrical moving means to be greater than in the other one thereof; and regulator means actuated by said movable member and including variable aperture diaphragm means arranged in the path of light directed at the main objective of the camera and at said photoresponsive resistance means for varying the amount of light applied to said photoresponsive resistance means and thereby varying said resistance value in a predetermined proportion to the movement of said movable member until the difference between said currents causing such movement is eliminated and both said currents are equal to each other and for simultaneously varying the amount of light directed at said main objective in the same manner.

5. An arrangement as claimed in claim 4, including in said other one of said branches at least one additional resistor of variable resistance adjustable for introducing, when required, a correction factor influencing the performance of the arrangement.

6. An arrangement as claimed in claim 4, including compensating resistance means connected in parallel with one of said electrical moving means for eliminating an existing difference between the resistances of said first and second electrical moving means.

7. An arrangement as claimed in claim 4, for use in a moving picture camera having a rotary shutter, wherein said shutter is provided with a reflecting surface oriented for periodically reflecting the light passing through said main objective in a predetermined different direction, said photoresponsive resistance means being arranged to be impinged upon by the light reflected by said reflecting surface.

8. An arrangement as claimed in claim 4, wherein said regulator means include first variable aperture diaphragm means arranged in the path of light directed at said main objective of the camera, and second variable aperture diaphragm means arranged in a second path of light substantially parallel with said first mentioned path, said photoresponsive means being arranged across said second path of light, said first and second diaphragm means being interconnected so as to move simultaneously and equally in relation to said main objective and said photoresponsive means, respectively.

References Cited by the Examiner

UNITED STATES PATENTS

| 947,490 | 1/10 | Gwozdz | 352—198 |
|---|---|---|---|
| 2,030,854 | 2/36 | Calver. | |
| 2,032,633 | 3/36 | Riszdorfer | 95—64 |
| 2,687,611 | 8/54 | Larsen. | |

FOREIGN PATENTS 1,212,381   10/59   France.

EVON C. BLUNK, *Primary Examiner.*

WILLIAM MISIEK, *Examiner.*